(12) United States Patent
Yoshimura (10) Patent No.: US 11,841,659 B2
(45) Date of Patent: Dec. 12, 2023

(54) APPARATUS INCLUDING POWER SOURCE UNIT CONTROLLING AC-DC CONVERTING UNIT BASED ON A DETECTED OVERCURRENT STATE

(71) Applicant: CANON KABUSHIKI KAISHA, Tokyo (JP)

(72) Inventor: Shotaro Yoshimura, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/748,613

(22) Filed: May 19, 2022

(65) Prior Publication Data
US 2022/0404752 A1    Dec. 22, 2022

(30) Foreign Application Priority Data

Jun. 21, 2021   (JP) ................ 2021-102225

(51) Int. Cl.
*G03G 15/00* (2006.01)
*H02M 3/335* (2006.01)
*H02M 1/32* (2007.01)

(52) U.S. Cl.
CPC ..... *G03G 15/5004* (2013.01); *G03G 15/5016* (2013.01); *G03G 15/80* (2013.01); *H02M 1/32* (2013.01); *H02M 3/33576* (2013.01)

(58) Field of Classification Search
USPC ......................................................... 399/88
See application file for complete search history.

(56) References Cited

U.S. PATENT DOCUMENTS

2015/0359040 A1\* 12/2015 Yamamoto ......... G03G 15/2039
219/488
2021/0223732 A1   7/2021 Yoshimura

FOREIGN PATENT DOCUMENTS

| JP | 2014-60898 A | 9/2012 |
| JP | 2020-78218 A | 11/2018 |
| JP | 2020-141458 A | 2/2019 |
| JP | 2020-58166 A | 4/2020 |

\* cited by examiner

*Primary Examiner* — Quana Grainger
(74) *Attorney, Agent, or Firm* — VENABLE LLP (57) ABSTRACT

An apparatus provided with a power source device indicating a converting unit includes a switching unit, a discriminating unit, and a controller. In the case where the discriminating unit discriminates that an overcurrent state occurs during an operation of the power source device in a first mode, the mode of the operation of the power source device is switched to a second mode by the switching unit and then the occurrence of the overcurrent state is notified.

10 Claims, 5 Drawing Sheets

APPARATUS INCLUDING POWER SOURCE UNIT CONTROLLING AC-DC CONVERTING UNIT BASED ON A DETECTED OVERCURRENT STATE

FIELD OF THE INVENTION AND RELATED ART

The present invention relates to an apparatus including a power source device and relates to a constitution for protecting, for example, the power source device mounted in an image forming apparatus such as a copying machine, a printer, or a facsimile machine, from an overload/overcurrent state.

The image forming apparatus, such as the copying machine, the printer, or the facsimile machine, for forming an image on a recording material by using an electrophotographic process or the like is provided with a power source device which generates a DC voltage from an AC voltage and which supplies electric power necessary for feeding of the recording material and image formation. The power source device outputs DC voltages of at least two systems in many cases. One is an output of a relatively low voltage necessary for a control element such as CPU/ASIC or for a control circuit. The other one is an output of a relatively high voltage supplied to a high-voltage power source for outputting a high voltage necessary for the electrophotographic process or to actuators such as motor/solenoid. Further, as a constitution of the power source device, a constitution in which a plurality of AC-DC converters are provided, a constitution in which only a single system of an AC-DC converter for outputting the relatively high voltage is provided and in which the relatively low voltage necessary for the control circuit is generated from the relatively high voltage by a DC-DC converter, and the like constitution exist. Particularly recently, in the power source device high in demand for cost reduction, a constitution in which the number of the AC-DC converters which are expensive is suppressed to one system has been widely used, and thus further simplification and cost reduction have been required.

Such a power source device is conventionally provided with a protective circuit, so that the power source device is protected from failure by stopping an operation of the power source device or the like in the case where the output is in an overcurrent state. In an apparatus to which the power source device supplies electric power, the power source device is in the overcurrent state in the case where large electric power more than assumption is consumed or in the case where a short-circuit failure or the like occurs in a power source path. Then, in the power source device, in order to avoid the occurrence of the failure or the like, the overcurrent state is detected and then the output is stopped. For example, in Japanese Laid-Open Patent Application No. 2020-058166, a power source device having a protective function such that switching control of a switching element is stopped by a primary-side control circuit is the case where abnormality such that an excessive current flows in the current due to a load short-circuit has been proposed.

However, particularly, in the constitution in which the power source device is provided with the AC-DC converter of the only one system, the following state is formed in the case where the AC-DC converter is in the overcurrent state and where the protective circuit acts and stops the outputted of the AC-DC converter. The output of the DC-DC converter connected to the output is also stopped, so that the operation of the apparatus including the power source device, for example, the operation of the image forming apparatus is completely stopped. In this case, there arises a problem such that a user cannot understand the reason why the operation of the power source device of the image forming apparatus suddenly stops. Further, in the case where an over current to the extension such that an over current protecting function does not act continuously flows although the power source device is in an overload state, there is a liability that an element in the power source device overheats due to the overload state and results in breakage of the element. Also, in this case, due to the breakage caused by the over current, the power source device suddenly stops the operation thereof. For this reason, there arises a problem such that the user does not understand the reason why the operation of the power source device of the image forming apparatus suddenly stops and then turns on a main switch of the image forming apparatus again, and thus there is a liability that failure damage is further expanded.

SUMMARY OF THE INVENTION

In the above-described circumferences, the present invention has been accomplished. A principal object of the present invention is to provide an apparatus including a power source device, capable of causing transition of a state of the power source device to a safe state before the state of the power source device reaches a breakage state and capable of notifying a user of that abnormality occurs.

According to an aspect of the present invention, there is provided an apparatus including a power source device which includes a converting unit configured to convert an AC voltage to a DC voltage and which is operable in a first mode in which a first DC voltage converted by the converting unit is outputted a second mode in which a second DC voltage converted by the converting unit and lower than the first DC voltage is outputted, the apparatus comprising: a switching unit configured to switch the mode of an operation of the power source device between the first mode and the second mode; a discriminating unit configured to discriminate whether or not an overcurrent state occurs in the converting unit; and a controller configured to carry out control so that in a case that the discriminating unit discriminate that the overcurrent state occurs during the operation of the power source device in the first mode, the mode of the operation of the power source device is switched to the second mode by the switching unit and then the occurrence of the overcurrent state is notified.

Further features of the present invention will become apparent from the following description of exemplary embodiments with reference to the attached drawings.

DESCRIPTION OF THE EMBODIMENTS

In the following, embodiments of the present invention will be specifically described with reference to the drawings.

Embodiment 1

[Image Forming Apparatus]

Figure 1:
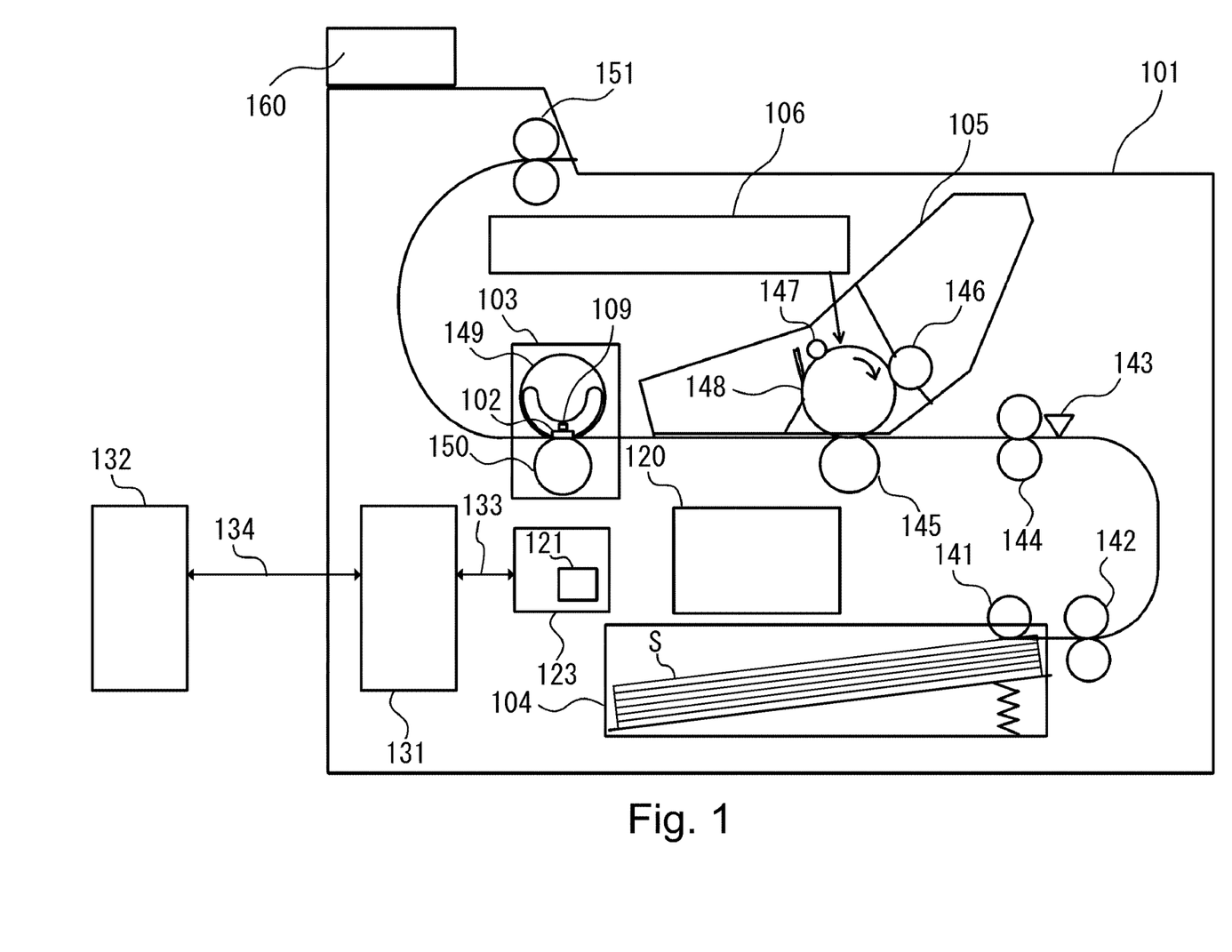
FIG. 1 is a schematic view showing a structure of an image forming apparatus of an embodiment 1.

In the following, an embodiment 1 in which an apparatus including a power source device according to the present invention is operated as an image forming apparatus will be described using the drawings. FIG. 1 is a schematic sectional view showing a structure of the image forming apparatus using an electrophotographic process. Incidentally, in the embodiment 1, as an example of the image forming apparatus, the case of a laser beam printer will be described, but another image forming apparatus such as a copying machine, a facsimile machine, or a multi-function machine having functions of these machine may be used.

Further, the power source device in the present invention may also be mounted in another electronic device. A laser beam printer main assembly 101 (hereinafter, referred to as a main assembly 101) includes a sheet (paper) feeding cassette 104 for accommodating a recording material S which is recording medium, a sheet feeding roller 141 for feeding the recording material S from the sheet feeding cassette 104, and a conveying roller pair 142. Further, the main assembly 101 includes a top sensor 143 provided downstream of the conveying roller pair 142 and for detecting a leading end of the recording material S, and a registration roller pair 144 for conveying the recording material S in a synchronism manner. Further, the main assembly 101 includes a cartridge unit 105 provided downstream of the registration roller pair 144 for forming a toner image on the recording material on the basis of laser light emitted from a laser scanner 106. The cartridge unit 105 includes a photosensitive drum 148 which is an image bearing member, a primary charging roller 147, a developing roller 146, and the like, which are needed for a known electrophotographic process, and forms the toner image on the recording material S in cooperation with a transfer roller 145. Further, the main assembly 101 includes a heat-fixing device 103 provided downstream of the cartridge unit 105 and for heat-fixing the (unfixed) toner image formed on the recording material S. The heat-fixing device 103 includes a fixing film 149, a pressing roller 150, and a heater 102 provided inside the fixing film 149.

The heat-fixing device 103 includes a thermistor 109 provided in the neighborhood of the heater 102 so as to detect a temperature of the heater 102 in the fixing film 149. Further, the main assembly 101 includes a discharging roller pair 151 provided downstream of the heat-fixing device 103, and after the toner image is formed, the recording material S on which the toner image is heat-fixed is discharged by the discharging roller pair 151.

A power source unit 120 (details thereof will be described later) which is a power source device is capable of outputting a voltage of 24 V or a voltage of 5 V in an appropriate switching manner, and outputs the voltage of 24 V in an operation in a print(ing) mode or in an operation in a stand-by mode. Here, the print mode refers to a state in which the image can be formed on the recording material S, and the stand-by mode refers to a state in which electric power consumption is lower than that in the print mode and in which the main assembly 101 waits for a print instruction for transition to the print mode. Further, there is also a sleep mode in which a minimum function of the main assembly 101 is activated and thus further electric power saving is realized. The power source unit 120 supplies, as a driving system voltage, the voltage of 24 V through an engine controller 123 described later. The driving system voltage is a voltage supplied to, for example, a driving unit such as a motor or clutch (not shown), and a driving portion (not shown) of a rotatable polygonal mirror included in the laser scanner 106.

The engine controller 123 carries out control of the main assembly 101, and carries out control of feeding of the recording material S by operating the respective rollers through control of the above-described driving unit (not shown). Further, the engine controller 123 controls the laser scanner 106, the cartridge unit 105, the heat-fixing device 103, and the like, and thus performs an image forming operation (printing operation). Further, in the engine controller 123, a DC-DC converter 121 described later is mounted, and the DC-DC converter 121 generates a voltage of 3.3 V, principally used in a control system, on the basis of a voltage supplied from the power source unit 120. Incidentally, the DC-DC converter 121 may also be provided outside the engine controller 123. The voltage of 3.3 V generated by the DC-DC converter 121 is supplied to a control circuit (not shown) provided inside the engine controller 123. The voltage of 3.3 V is further supplied to a circuit of the control system including a video controller 131 described later, a laser light emitting portion (not shown) of the laser scanner 106, the top sensor 143, and the like. The video controller 131 is connected to the engine controller 123 through an engine interface 133 and is connected to an external device 132 such as a personal computer through a general-purpose interface 134 (for example, USB or the like).

In the power source unit 120, a zero-cross timing of an AC power source 201 (see FIG. 2) described later is detected, and a zero-cross detecting signal (not shown) is sent to the engine controller 123. Then, the engine controller 123 controls a heater switching unit (means) (not shown) so that electric power from the AC power source 201 provides a duty ratio with a predetermined phase angle and a predetermined wave number in synchronism with the zero-cross timing, and thus carries out control so that a temperature of the heater 102 becomes a predetermined temperature.

The video controller 131 receives print information (for example, the number of printing sheets and various settings) and printing data from the general-purpose interface 134. Further, the video controller 131 includes an image controller (not shown) mounted therein, by which the printing data is developed into image data capable of being actually printed. Thereafter, the engine controller 123 receives the image data from the video controller 131 through the engine interface 133 at a predetermined timing, and sends the image data to the laser scanner 106. In the image forming operation, members contributing to formation of the image on the recording material S during image formation functions as an image forming unit (means).

[Power Source Unit]

Figure 2:
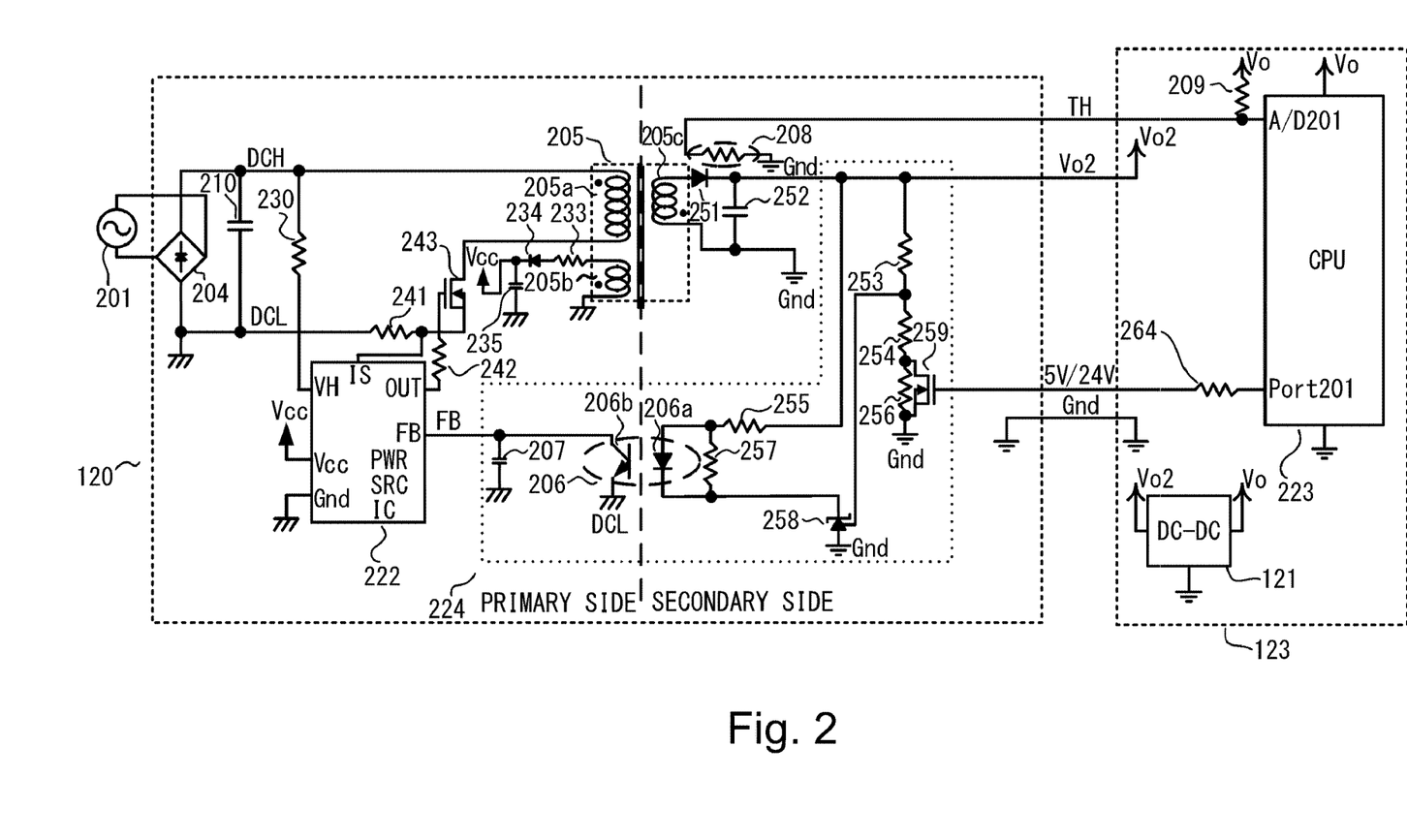
FIG. 2 is a circuit diagram showing a power source unit and an engine controller in the embodiment 1.

FIG. 2 is a circuit diagram showing a constitution of the power source unit 120 which is the power source device in the embodiment 1 and the engine controller 123. To the power source unit 120, the AC power source 201 is connected, a voltage Vo2 is generated from an inputted AC voltage and is outputted to a secondary side. Here, the DC voltage Vo2 includes at least two output voltage values consisting of 24 V which is a first DC voltage and 4 V which is a second DC voltage. For example, 24 V is outputted as the DC voltage Vo2 when the main assembly 101 is in the print mode or the stand-by mode (in a stand-by state capable of instantaneous printing). Hereinafter, a state in which the DC voltage Vo2 is 24 V is referred to as a first output mode (first mode). On the other hand, 5 V is outputted as the DC voltage Vo2 when the main assembly 101 is in the sleep mode (electric power saving mode). Hereinafter, a state in which the DC voltage Vo2 is 5 V is referred to as a second output mode (second mode). The engine controller 123 includes a CPU 223 which is a control unit (means), and the CPU 223 performs switching of the DC voltage Vo2. The CPU 223 functions as a switching unit (means) for switching the mode of the main assembly 101 between the first mode and the second mode. Incidentally, the power source unit 120 may include the CPU 223 by providing the CPU 223, provided in the printer main assembly 101, integrally with a power source substrate (not shown) or in a like manner.

An AC voltage of the AC power source 201 inputted to the power source unit 120 is rectified by a bridge diode 204 and thereafter is smoothed by a capacitor 210, and thus becomes DC voltage with a DCL line as a negative pole and a DCH line as a positive pole. The DCH line is not only connected to one of two terminals of a primary winding 205a of a power source transformer 205 but also connected to a VH terminal of a power source IC 222 through a resistor 230, so that the voltage is supplied.

The power source IC 222 starts an operation under application of the voltage to the VH terminal. Incidentally, in FIG. 2, a side where the primary winding 205a and a first auxiliary winding 205b of the transformer 205 are provided is a primary side, and a side where a secondary winding 205c is provided is a secondary side.

A field-effect transistor (FET) 243 which is a switching element includes a drain terminal connected to the other terminal of the primary terminal 205a in series and a source terminal connected to the DCL line through a current detecting resistor 241. Further, a gate terminal of the FET 243 is connected to an OUT terminal of the power source IC 222 through a gate resistor 242. The power source IC 222 carries out ON/OFF control of the FET 243, whereby a current flows through the primary winding 205a. The current flowing through the primary winding 205a is converted to a voltage by the current detecting resistor 241, and the voltage is inputted to an IS terminal of the power source IC 222. The power source IC 222 monitors the voltage of the IS terminal and carries out control so that the current flowing through the primary in which 205a and the FET 243 falls within a predetermined current range.

When the current flows through the primary winding 205a, a flyback voltage is induced in the primary auxiliary winding 205b and the secondary winding 205c so as to have an opposite polarity. The voltage induced in the primary auxiliary winding 205b is rectified smoothed through the resistor 233, the diode 234, and the capacitor 235, and then is outputted as a voltage Vcc. Then, this voltage Vcc is supplied as a power source voltage to a Vcc terminal of the power source IC 222. Further, the voltage induced in the secondary winding 205c is rectified by a secondary-side rectifying diode 251 which is a rectifying element and thereafter is smoothed by a secondary-side smoothing capacitor 252 which is a smoothing unit (means) and then is outputted as the DC voltage Vo2. The bridge diode 204, the capacitor 210, the transformer 205, the FET 243, the power source IC 222, the secondary-side diode 251, and the secondary-side smoothing capacitor 252 function as a converting unit (means) for converting the AC voltage to the DC voltage.

(Feed-Back Circuit)

Next, a feed-back circuit 224 will be described. The feed-back circuit 224 is constituted by a resistor 253, a resistor 254, a resistor 255, a resistor 256, a resistor 257, a shunt regulator 258, an FET 259, a photocoupler 206, a capacitor 207, and the like.

The feed-back circuit 224 monitors the DC voltage Vo2 and feeds back, as an FB signal, the DC voltage Vo2 from a secondary-side circuit to an FB terminal of the primary-side power source IC 222 through the photocoupler 206 so that the DC voltage Vo2 becomes 5 V or 24 V. The power source IC 222 carries out the ON/OFF control of the FET 243 so that the DC voltage Vo2 becomes a predetermined voltage, on the basis of a voltage depending on the FB signal inputted to the FB terminal. Further, to the feed-back circuit 224, a 5 V/24 V signal is inputted from the engine controller 123, so that an output voltage is switched by the 5 V/24 V signal so that the DC voltage Vo2 becomes 5 V or 24 V. The feed-back circuit 224 performs the feed-back so that the DC voltage Vo2 becomes 5 V when the 5 V/24 V signal is at a high level and becomes 24 V when the 5 V/24 V is at a low level.

To between the DC voltage Vo2 and the ground ("Gnd"), the resistor 253, the resistor 254, and the resistor 256 are connected in series, and to the resistor 256, the FET 259 is connected in parallel. A drain terminal of the FET 259 is connected to a connecting point between the resistor 254 and the resistor 256, and a source terminal of the FET 259 is connected to the Gnd. Further, to a gate terminal of the FET 259, the 5 V/V 24 signal is inputted from the engine controller 123.

A photo-diode 206a of the photocoupler 206 includes an anode terminal connected to the DC voltage Vo2 through the resistor 255 and a cathode terminal connected to a cathode terminal of the shunt regulator 258.

Incidentally, the resistor 257 connected to the photo-diode 206a of the photocoupler 206 in parallel is a resistor for bypassing a leak current of the shunt regulator 258. The shunt regulator 258 includes an anode terminal connected to the Gnd of the DC voltage Vo2 and a reference terminal connected to a connecting point between the resistor 253 and the resistor 254. Further, a photo-transistor 206b of the photocoupler 206 includes a collector terminal connected, as an FB signal, to the FB terminal of the power source IC 222 and an emitter terminal connected to DCL line. Here, the capacitor 207 is a capacitor which is provided for the FB signal and which is used for noise absorption, and is connected to between the FB terminal and the DCL line of the power source IC 222.

Next, a method in which the feed-back circuit 224 switches the DC voltage Vo2 from 24 V to 5 V will be described. When the 5 V/24 V signal outputted from the engine controller 123 is at a high level, the FET 259 is in an ON state. At this time, a voltage divided from the DC voltage Vo2 by the resistor 253 and the resistor 254 is inputted to the reference terminal of the shunt regulator 258. Then, the voltage is fed back to the FB terminal of the power source IC 222 through the photocoupler 206 so that the voltage at the reference terminal of the shunt regulator 258 becomes the same voltage as an internal reference voltage, with the result that the DC voltage Vo2 is controlled to 5 V. Further, when the 5 V/24 V signal is at a low level, the FET 259 is in an OFF state. At this time, a voltage divided from the DC voltage Vo2 by the resistor 253, the resistor 254, and the resistor 256 is inputted to the shunt regulator 258. Then, the voltage is fed back to the FB terminal of the power source IC 222 through the photocoupler 206 so that the voltage at the reference terminal of the shunt regulator 258 becomes the same voltage as the internal reference voltage, with the result that the DC voltage Vo2 is controlled to 24 V.

(Engine Controller or the Like)

In the engine controller 123, the CPU 223 and the DC-DC converter 121 are mounted. The DC voltage Vo2 outputted from the power source unit 120 is connected, together with a control signal (not shown) outputted from the CPU 223, from the engine controller 123 to the above-described driving unit (not shown) or a high-voltage power source (not shown), or the like. Incidentally, in the operation in the sleep mode, the DC voltage Vo2 becomes 5 V. Therefore, in order not to unnecessarily supply the voltage of 5 V to the driving unit or the like, in the operation in the sleep mode, a switch or the like for cutting off the supply of the DC voltage Vo2 may be provided.

The 5 V/24 V signal is outputted from the engine controller 123 to the power source unit 120. The 5 V/25 V signal is outputted from a Port 201 terminal of the CPU 223 through a resistor 264, so that the high level or the low level is inputted to the power source unit 120. The CPU 223 switches the C voltage Vo2 to 5 V or 24 V by switching a level of the Port 201 terminal to the high level or the low level.

The DC voltage Vo2 outputted from the power source unit 120 is inputted to the engine controller 123. Also, to the DC-DC converter 121 which is a generating unit (means), the DC voltage Vo2 is inputted. The DC-DC converter 121 outputs a voltage Vo which is a third DC voltage lower than the DC voltage Vo2 (Vo<Vo2). Here, the DC-DC converter 121 operates so as to output a predetermined voltage (for example, 3.3 V) even when the inputted DC voltage Vo2 is either one of 24 V and 5 V. Further, the voltage Vo is supplied as described above to the circuit of the control system including the CPU 223 in the engine controller 123, the control circuit (not shown), the video controller 131, the laser light emitting portion (not shown) of the laser scanner 106, the top sensor 143, and the like.

A thermistor 208 (temperature detecting unit (means)) which is a through detecting element is provided inside the power source unit 120 and is disposed in the neighborhood of the transformer 205 (the secondary winding 205c thereof in this case) which is a heat generating element by an increase in load current and in the neighborhood of the secondary-side rectifying diode 251. The thermistor 208 includes one terminal connected to the secondary-side Gnd and the other terminal connected to an A/D 201 terminal which is an A/D port of the CPU 223 on the engine controller 123, so as to input a TH signal to the A/D 201 terminal. Then, the TH signal is pulled up by a pull-up resistor 209 on the engine controller 123.

The CPU 223 monitors the TH signal in a state in which the main assembly 101 is in the stand-by mode or the print mode (the low-level state of the 5 V/24 V signal), and discriminates whether or not the temperature detected by the thermistor 208 falls within a normal range. In the case where a temperature which is a detection result of the thermistor 208 is a predetermined temperature or less, the CPU 223 discriminates that the transformer 205 and the secondary-side rectifying diode 251 normally operates. The predetermined temperature is a threshold of a temperature for discriminating whether the state of the CPU 223 is normal or abnormal. At this time, the CPU 223 discriminates that a load current falls within a normal value.

On the other hand, in the case where the temperature which is the detection result of the thermistor 208 is higher than the predetermined temperature, the CPU 223 discriminates that the load current of the power source unit 120 becomes an abnormally high state and temperatures of the transformer 205 and the secondary-side rectifying diode 251 increase to abnormally high temperatures. In the case where the temperature detected by the thermistor 208 is higher than the predetermined threshold, the CPU 223 discriminates that the state of the transformer 205 and the secondary-side rectifying diode 251 are an overcurrent state. The CPU 223 functions as a discriminating unit (means) for discriminating that the state of the power source unit 120 is the overcurrent state in which an over current occurs. In this case, the CPU 223 causes transition of the level of the 5 V/24 V signal from the low level to the high level. Then, the CPU 223 notifies the video controller 131 of that a load state of the main assembly 101 is abnormal. The video controller 131 causes a display panel 160 of the main assembly 101 to display a message that the load state is abnormal (i.e., an overload state), for example, information to the effect that the power source unit 120 causes an error. Further, the video controller 131 notifies the external device 132, through the general-purpose interface 134, of information to the effect that the power source unit 120 is in the overload state and may cause a screen of the external device 132 to display a message to that effect.

Further, the main assembly 101 may print, on the recording material S, the message indicating that the power source unit 120 is in the overload state and then may output the recording material S. By this, the CPU 223 is capable of notifying a user of that the power source unit 120 is in an abnormal state. Thus, in the embodiment 1, in the case where the CPU 223 discriminates that the power source unit 120 is in the overcurrent state, the CPU 223 switches the state of the DC voltage Vo2 to the second mode and carries out control so that the overcurrent state of the power source unit 120 is notified to the user.

[Discriminating Process and Notifying Process of Abnormality]

Figure 3:
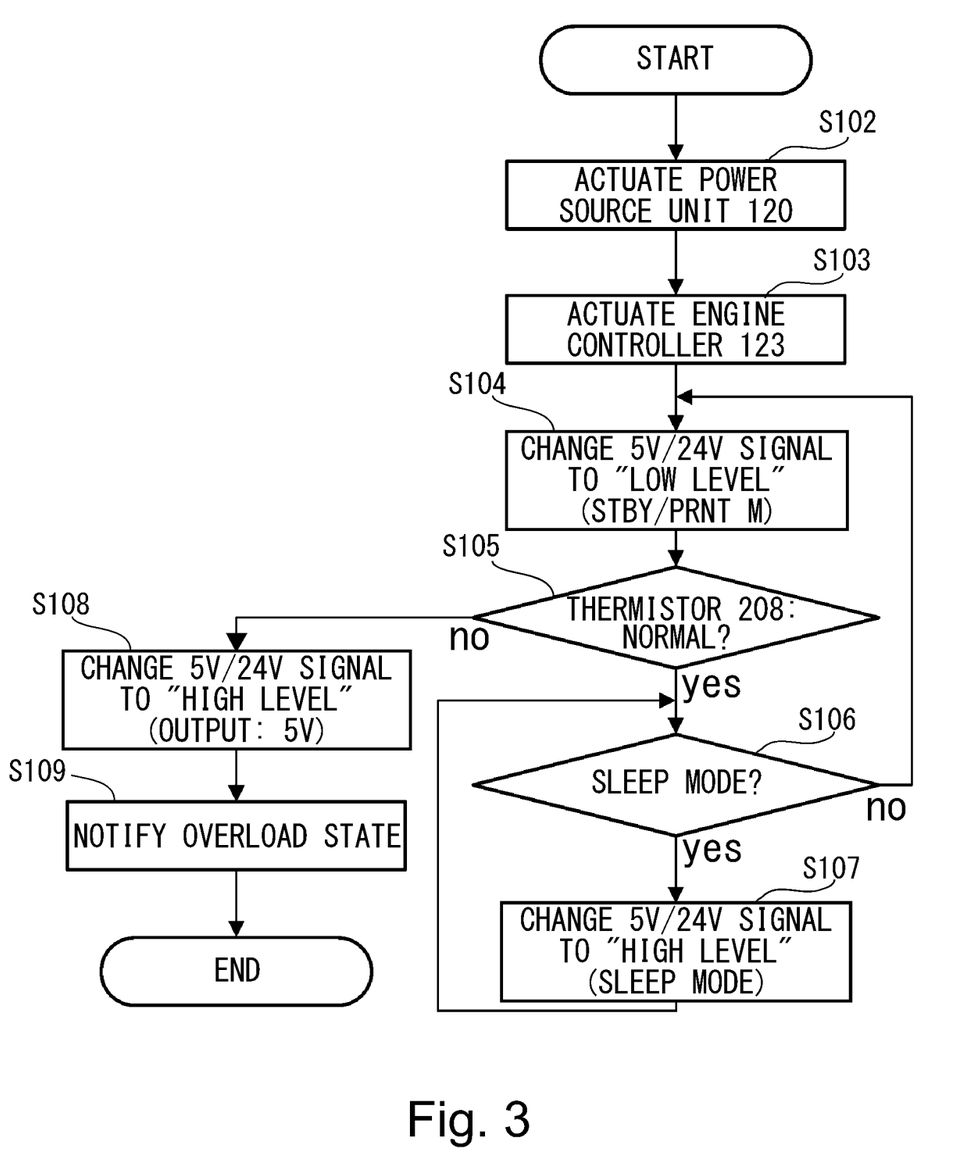
FIG. 3 is a flowchart showing control in the embodiment 1.

Next, control of the embodiment 1 will be described using FIG. 3. When a power source of the main assembly 101 is turned on, processes of step (S) 102 and later steps are executed. In S102, the power source unit 120 is actuated when a voltage is applied to the VH terminal of the power source IC 222 in the power source unit 120.

At this time, the 5 V/24 V signal is in the low-level state. For this reason, the power source unit 120 is first in a state (first voltage current mode) in which the DC voltage Vo2 of 24 V is outputted, and thus supplies the DC voltage Vo2 of 24 V to the engine controller 123.

In S103, the engine controller 123 is actuated by being supplied with the DC voltage Vo2 in S102, and causes the DC-DC converter 121 to start an operation and to output the voltage Vo. By this, the voltage Vo is supplied to the CPU 223, so that the CPU 223 starts an operation. In S104, the CPU 223 continues the operation in the print mode or the stand-by mode ("STBY/PRINT M") at the low level of the 5 V/24 V signal by being supplied with the voltage Vo in S103. In S105, the CPU 223 monitors a state of the thermistor 208 and discriminates whether or not the temperature detected by the thermistor 208 falls within a normal range. Specifically, the CPU 223 discriminates that the power source unit 120 is normal when the detected temperature is a predetermined temperature or less and is abnormal when the detected temperature is higher than the predetermined temperature.

In the case where the CPU 223 discriminated in S105 that the detected temperature falls within the normal range, the CPU 223 causes the sequence to go to S106, and in the case where the CPU 223 discriminated in S105 that the detected temperature does not fall within the normal range, the CPU 223 causes the sequence to go to S108. In S106, the CPU 223 discriminates whether or not transition to the sleep mode is enable. In the case where the CPU 223 discriminated in S106 that the transition to the sleep mode is disable, the CPU 223 causes the sequence to return to S104. In the case where the CPU 223 discriminated in S106 that the transition to the sleep mode is enable, the CPU 223 causes the sequence to go to S107. In S107, the CPU 223 causes transition of the 5 V/24 V signal to the high level and thus causes the transition to the sloop mode, and then causes the sequence to return to S106.

In S108, the CPU 223 causes the transition of the 5 V/24 V signal to the high level and thus switches the DC voltage Vo2 from 24 V to 5 V (5 V output). By a lowering in DC voltage Vo2, a load current remarkably decreases, so that the temperature also lowers. As a result, it is possible to avoid breakage of respective elements of the power source unit 120 and to continuously output the DC voltage Vo2 safely. In S109, the CPU 223 causes a user interface such as the display panel 160 to display information to the effect that abnormality occurs in an output line of the power source unit 120 including the main assembly, i.e., that the output line is in the overload state, and notifies the user of the abnormality of the output line. Then, the CPU 223 causes the power source unit 120 to stop the operation thereof, and ends the sequence. Incidentally, before the operation of the power source unit 120 is stopped, when the CPU 223 monitors the state of the thermistor 208 and the temperature returns to a normal range, the operation of the power source unit 120 may also be continued.

In the embodiment 1, the thermistor 208 is disposed in the neighborhood of the elements, such as the secondary winding 205c of the transformer 205 and the secondary-side rectifying diode 251, which re liable to generate heat when the secondary-side elements are in an over current load state.

However, the constitution of the thermistor 208 is not limited to the constitution shown in FIG. 2, but may also be disposed in the neighborhood of elements, such as the primary-side FET 243 and the primary winding 205a of the transformer 205, which are more liable to increase in temperature depending on the load current. However, in the case where the primary-side element is detected, for safe, there is a need to take insulation between the primary side and the secondary side into consideration. That is, there is a need to transmit a detection result by the primary-side temperature detecting unit (means) to the secondary-side engine controller 123 with use of a transmitting unit (means) by insulation, such as a photocoupler. Thus, the thermistor 208 may also detect a temperature of at least one of the primary winding 205a, the secondary winding 205c, the FET 243, and the secondary-side rectifying diode 251. Further, the element of which temperature is detected is not limited to the above-described elements, the element may only be required to generate heat by a flow of a current therethrough (hereinafter, this element is referred to as a heat generating element). For example, a load switch (not shown), a resistor for detecting the current, and the like, which are provided on the secondary side are included in the heat generating element.

Further, in the embodiment 1, description was made using the cases of the two modes in which the DC voltage Vo2 is 24 V and 5 V, but the present invention is not limited thereto. The present invention is also applicable to a system including output voltages more than and different from the two modes of the DC voltages, depending on the structure and the uses of the associated device. That is, the power source device may only be required to output two or more different voltages. In this case, depending on a heat generation amount, an operation of switching the voltage to a lower voltage may be repeated plural times, and a switching voltage may be selected depending on the heat generating amount. Further, depending on a value of the switching DC voltage Vo2, the threshold (such as a normal temperature range) for discriminating the abnormality may be changed. For example, when the DC voltage Vo2 is 5 V, the abnormality may be discriminated at a lower temperature than the temperature when the DC voltage Vo2 is 24 V. In this case, the CPU 223 may only be required to monitor the state of the thermistor 208 even in a state (for example, after the process of S107 of FIG. 3) in which the power source unit 120 outputs 5V as the DC voltage Vo2.

As described above, in the embodiment 1, the load state of the power source unit 120 is monitored by the thermistor 208, and whether or not a state in which an abnormal load is generated is formed is discriminated on the basis of a detection result of the thermistor 208. Then, in the case where discrimination that the abnormal load generation state is formed is made, the element of the power source unit 120 is prevented from breaking, so that it becomes possible to cause transition of the mode by switching the voltage to a voltage at which a safe state is formed. Further, it is possible to notify the user of an abnormal load state of the power source unit 120. Thus, even in the case where abnormality occurs in the image forming apparatus and a connecting device thereof and thus a load current of the power source device becomes excessive, it is possible to maintain the elements provided in the power source device in a safe state and to notify the user of an occurrence of the abnormality while utilizing an already-existing structure.

As described above, according to the embodiment 1, it is possible to cause transition of the state of the power source device to the safe state before the power source device breaks and to notify the user of the occurrence of the abnormality.

Embodiment 2

[Power Source Unit]

Next, an embodiment 2 will be described using the drawings. In the above-described embodiment 1, an example in which the over current of the power source unit 120 is detected by the thermistor 208 which is a temperature detecting element was described.

Figure 4:
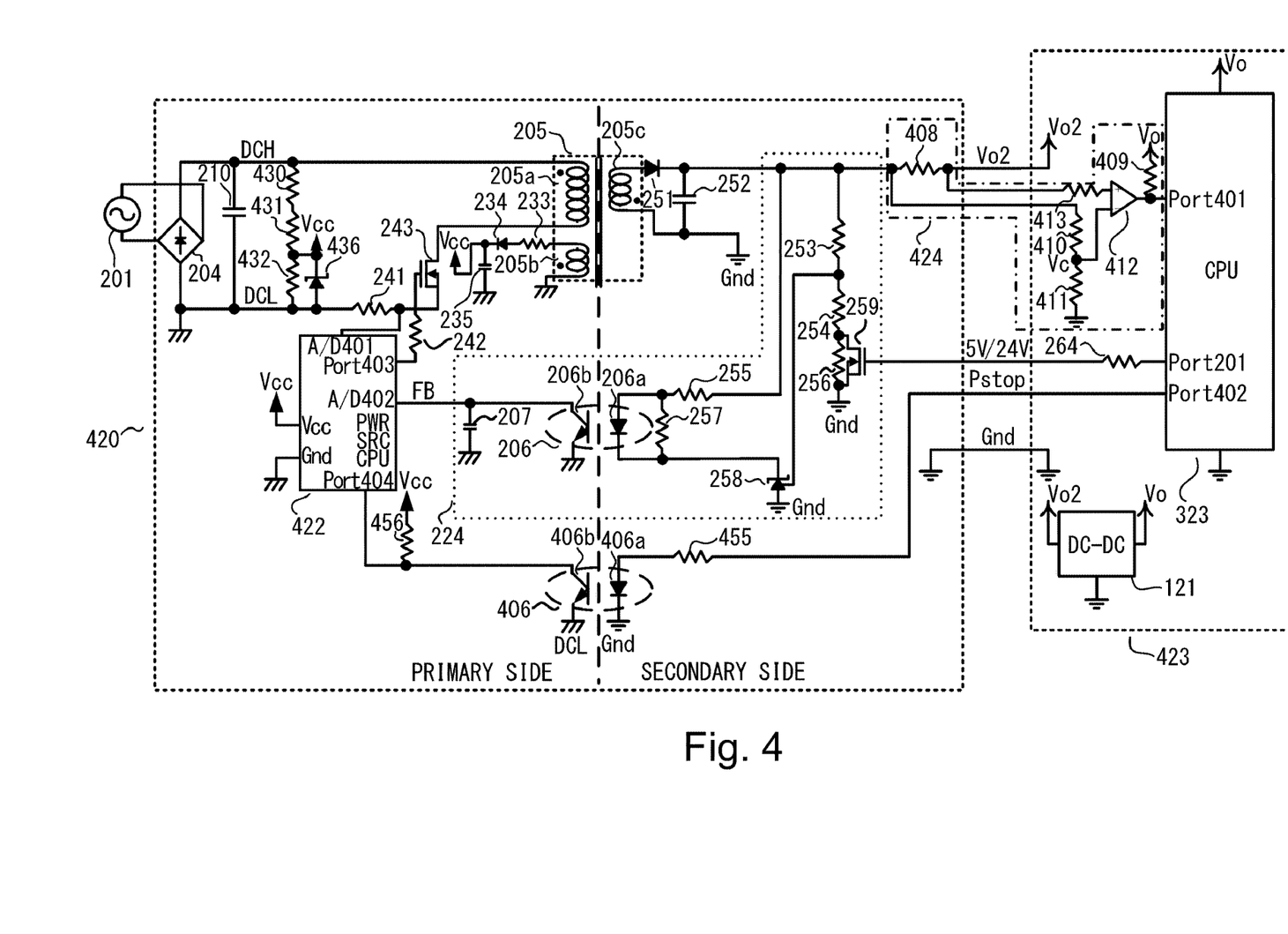
FIG. 4 is a circuit diagram showing a power source unit and an engine controller in an embodiment 2.

In the embodiment 2, an example in which an over current of a power source unit 420 is detected by an over current detecting circuit 424 (current detecting unit (means)) for detecting the current flowing through the transformer 205 will be described.

Incidentally, principal structure and operation are as described in the embodiment 1, and therefore, will be omitted from description by adding the same reference numerals or symbols. Further, similarly, the power source unit 120 and the engine controller 123 are read as the power source unit 420 and an engine controller 423, respectively. In the following description will be made specifically.

FIG. 4 is a circuit diagram showing a constitution of the power source unit 420 and the engine controller 423. Compared with FIG. 2, the power source unit 120, the engine controller 123, the power source IC 222, and the CPU 223 are replaced with the power source unit 420, the engine controller 423, a CPU 422, and a CPU 323, respectively. These CPUs 422 and 323 are power source controller. However, principal operations of these members are substantially the same as those in the embodiment 1. On the other hand, the embodiment 2 is different from the embodiment 1 in that the thermistor 208 and the pull-up resistor 209 are deleted and the over current detecting circuit 424 is added. In the following, the difference will be principally described.

The power source unit 420 generates the DC voltage Vo2 from the inputted AC voltage, and outputs the DC voltage Vo2 to the secondary side. In the embodiment 2, control of the DC voltage Vo2 is carried out by the power source CPU 422 provided on the primary side. Further, switching of the DC voltage Vo2 between 5V and 24 V is performed by the CPU (control unit (means)) mounted in the engine controller 423. The AC voltage inputted to the power source unit 420 is rectified and smoothed by a bridge diode 204 and the capacitor 210, and becomes DC voltages of the DCL line and the DCH line. The voltages are divided by a resistor 430, a resistor 431, and a resistor 432. To the resistor 432, a Zener diode 436 is connected in parallel and is clamped by the voltage Vcc, and then is supplied to the Vcc terminal. The power source CPU 422 starts an operation thereof under application of the voltage to the Vcc terminal.

The resistor CPU 422 includes a Port 403 terminal connected to the gate terminal of the FET 243 through the gate resistor 242 and carries out ON/OFF control of the FET 243 by setting the Port 403 terminal at the high level or the low level. Then, when the current flows through the primary winding 205a, the current is converted to a voltage by the current detecting resistor 241, and the voltage is inputted to an A/D 401 terminal which is an A/D port of the power source CPU 422. The power source CPU 422 monitors the voltage of the A/D 401 terminal, and carries out control so that a current flowing through the primary winding 205a and the FET 243 falls within a predetermined current range. Incidentally, when a voltage is induced in the primary winding 205b through actuation of the power source CPU 422 and a start of the switching operation of the FET 243 and is started to be outputted to the capacitor 235, the voltage Vcc is switched and supplied from the primary winding 205b. Further, the FB signal outputted from the feed-back circuit 224 is inputted to an A/D 402 terminal which is an A/D port of the power source CPU 422.

(Overcurrent Detecting Circuit)

Next, the over current detecting circuit 424 will be described. An output stage of the DC voltage Vo2 is provided with a current detecting resistor 408 for detecting a current flowing through the engine controller 423. The voltage of the current detecting resistor 408 on the primary side is divided by a resistor 410 and a resistor 411 provided on the engine controller 423, and the voltage Vc obtained by division is inputted to an inverting input terminal (−terminal) of a comparator 412 similarly provided on the engine controller 423. The voltage (DC voltage Vo2) of the current detecting resistor 408 on the output side is inputted to a non-inverting input terminal (+flow) of the comparator 412 through a resistor 413 similarly provided on the engine controller 423. An output terminal of the comparator 412 not only is inputted to a Port 401 terminal of the CPU 323 but also is pulled up to the voltage Vo by a resistor 409.

In the case where the control flowing through the engine controller 423 falls within a normal range, a lowering in voltage by the resistor 408 is small, and the resultant DC voltage Vo2 is higher than the voltage Vo divided by the resistor 410 and the resistor 411 (Vo2>Vo). Accordingly, an output of the comparator 412 is at the high level, and is inputted to the CPU 323. In the case where the current flowing through the engine controller 423 exceeds the normal range, the voltage lowering by the resistor 408 becomes large, so that the DC voltage Vo2 becomes lower than the voltage Vc (Vo2<Vc). Accordingly, the output of the comparator 412 is inverted to the low level, and is inputted to the Port 401 terminal of the CPU 323. In the case where the DC voltage Vo2 is lower than the voltage Vc, in other words, in the case where the convert detected by the over current detecting circuit 424 is larger than the predetermined threshold, the CPU 323 discriminates that the overcurrent state is formed. The CPU 323 monitors the level of the Port 401 terminal, and thus discriminates normality or abnormality of the convert value.

In the case where the DC voltage Vo2 is 5 V, a difference $\Delta V_{5V}$ between the voltage Vc divided by the resistors 410 and 411 and the DC voltage Vo2 becomes smaller than a difference $\Delta V_{24V}$ in the case where the DC voltage Vo2 is 24 V ($\Delta V_{5V} < \Delta V_{24V}$). That is, when the DC voltage Vo2 is 5 V, the output of the comparator 412 is inverted by a low output current than when the DC voltage Vo2 is 24 V, and abnormality is notified to the CPU 323. In the case where the low level is inputted to the Port 401 terminal when the DC voltage Vo2 is 24 V, the CPU 323 causes the transition of the level of a Port 201 terminal from the low level to the high level, so that the DC voltage Vo2 is switched from 24 V to 5 V. Further, in the case where the low level is inputted to the Port 401 terminal when the DC voltage Vo2 is 5 V, the CPU 323 causes the transition of the level of a Port 402 terminal from the low level to the high level, and thus causes the transition of the level of a Pstop signal.

(Pstop Signal)

The Pstop signal outputted from a Port 402 of the CPU 323 is inputted from the engine controller 423 to the power source unit 420 and then is inputted to an anode terminal of a photo-diode 406a of a photocoupler 406 through a resistor 455. A cathode terminal of the photo-diode 406a is connected to the secondary-side Gnd. A phototransistor 406b of the photocoupler 406 includes a collector terminal not only inputted to a Port 404 terminal of the power source CPU 422 but also pulled up to the voltage Vcc by a resistor 456. An emitter terminal of the photo-transistor 406b is connected to the DCL line. When the Pstop signal is at the low level, the photo-diode 406a of the photocoupler 406 is turned off. The collector terminal of the photo-transistor 406b of the photocoupler 406 becomes the high level, so that the port 404 terminal of the power source CPU 422 becomes the high level. The power source CPU 422 discriminates that the power source unit 420 is normal since the Port 404 terminal is in the high-level state, and continues the operation thereof.

On the other hand, when the Pstop signal becomes the high level, the photo-diode 406a of the photocoupler 406 is turned on, so that the collector terminal of the phototransistor 406b of the photocoupler 406 becomes the low level. When the power source CPU 422 detects that the transition of the level of the Port 404 terminal to the low level is made, the power source CPU 422 discriminates that some abnormality occurs, and the operation of the power source CPU 422 is stopped. In the embodiment 2, in the case where the CPU 323 discriminates that the overcurrent state is formed in the operation in the second mode, the CPU 323 stops the operation of the power source CPU 422.

[Discriminating Process and Notifying Process of Abnormality]

Figure 5:
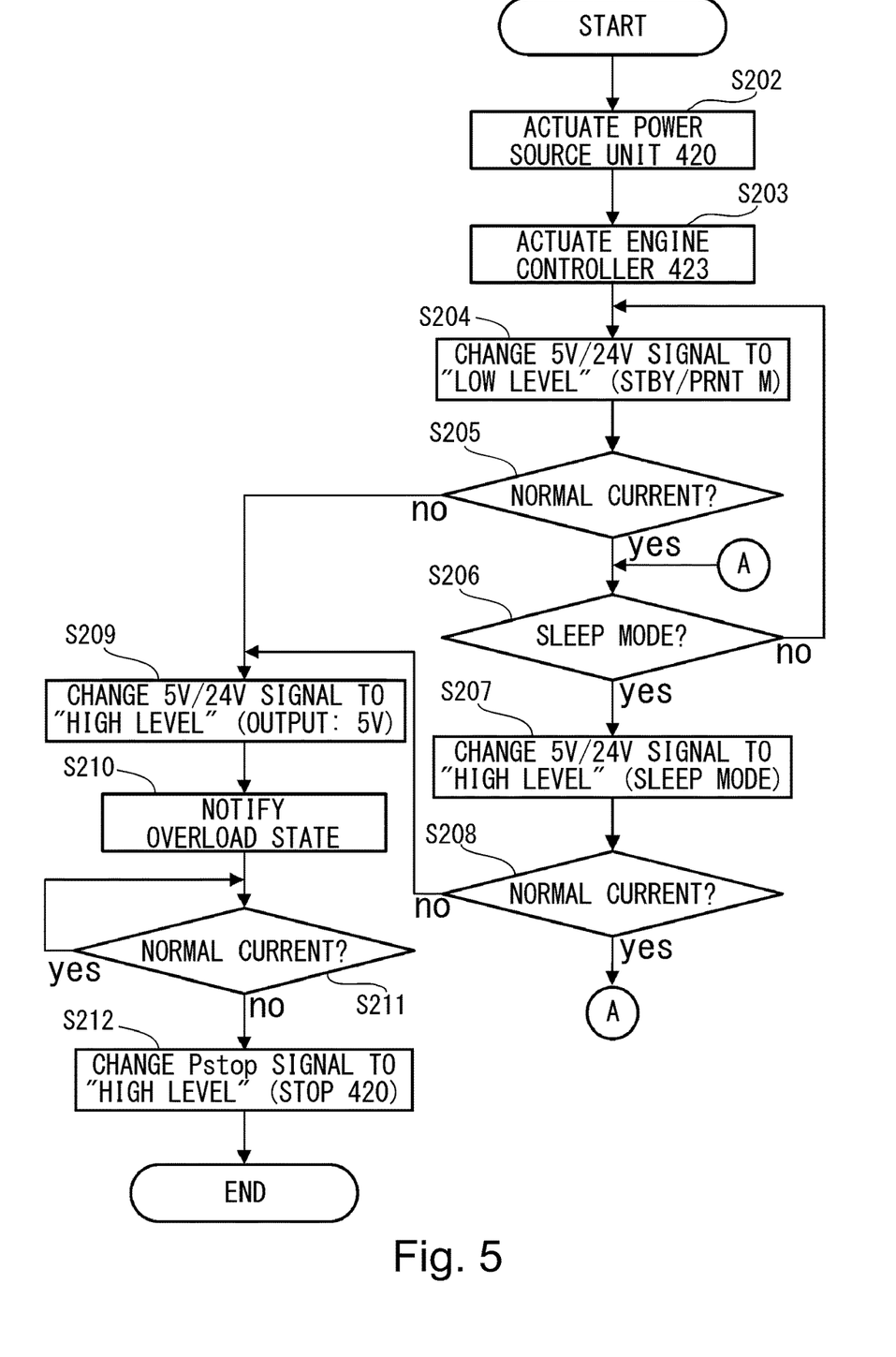
FIG. 5 is a flowchart showing control in the embodiment 2.

Next, control of the embodiment 2 will be described using FIG. 5. When a power source of the main assembly 101 is turned on, processes of S202 and later are executed. In S202, the power source unit 420 is actuated when a voltage is applied to the VH terminal of the power source CPU 422 in the power source unit 420.

At this time, the 5 V/24 V signal is in the low-level state, and therefore, the DC voltage Vo2 which is the output voltage of the power source unit 120 is 24 V, so that the DC voltage Vo2 is supplied to the engine controller 423. In S203, the engine controller 423 is actuated by being supplied with the DC voltage Vo2 in S202, and causes the DC-DC converter 121 to start an operation and to output the voltage Vo, so that the CPU 323 starts an operation. In S204, the CPU 323 continues the operation in the print mode or the stand-by mode at the low level of the 5 V/24 V signal.

In S205, the CPU 323 monitors a state of the over current detecting circuit 424 and discriminates whether or not the current 208 falls within a normal range. Specifically, the CPU 323 discriminates that the power source unit 420 is normal when the DC voltage Vo2 is the voltage Vc or more is abnormal when the DC voltage Vo2 is tower than the voltage Vc.

In the case where the CPU 323 discriminated in S205 that the current falls within the normal range, the CPU 323 causes the sequence to go to S206, and in the case where the CPU 323 discriminated in S205 that the current does not fall within the normal range, the CPU 323 causes the sequence to go to S209. In S206, the CPU 323 discriminates whether or not transition to the sleep mode is enable. In the case where the CPU 323 discriminated in S206 that the transition to the sleep mode is disable, the CPU 323 causes the sequence to return to S204, and in the case where the CPU 323 discriminated in S206 that the transition to the sleep mode is enable, the CPU 323 causes the sequence to go to S207. In S207, the CPU 323 causes transition of the 5 V/24 V signal to the high level and thus causes the transition to the sloop mode. In S208, the CPU 323 discriminates whether or not the current falls within the normal range by monitoring the state of the overcurrent detecting circuit 424. In the case where the CPU 323 discriminated in S208 that the current falls within the normal range, the CPU 323 causes the sequence to return to S206, and in the case where the CPU 323 discriminated in S208 that the current does not fall within the normal range, the CPU 323 causes the sequence to go to S209.

In the discrimination of S205 or S209, in the case where the CPU 323 discriminated that the current exceeds the normal range and is abnormal, in S209, the CPU 323 causes the transition of the 5 V/24 V signal to the high level and thus switches the DC voltage Vo2 from 24 V to 5 V (5 V output). By a lowering in DC voltage Vo2 from 24 V to 5 V, a load current remarkably decreases, so that the temperature also lowers. In S210, the CPU 323 causes a user interface such as the display panel 160 to display a message that abnormality occurs in an output line of the power source unit 420 including the main assembly, and notifies the user of that the overload state is formed. In S211, the CPU 323 discriminates whether or not the current falls within the normal range by monitoring the state of the over current detecting circuit 424. In the case where the CPU 323 discriminated in S211 that the current falls within the normal range, the CPU 323 causes the sequence to return to S211, and in the case where the CPU 323 discriminated in S211 that the current exceeds the normal range and is abnormal, the CPU 323 causes the sequence to S212. In S212, the CPU 323 changes the level of the Pstop signal from the low level to the high level since the overcurrent state is not eliminated although the output of the DC voltage Vo2 is changed to the 5 V output, so that the operation of the power source CPU 422 is stopped, and thus the operation of the power source unit 420 is stopped.

As described above, in the embodiment 2, by a protective function with the two stages, it is possible to avoid breakage of the elements of the power source unit 420 and to completely stop the DC voltage Vo2. Incidentally, in S209 of FIG. 5, in the case where the over current is detected when the DC voltage Vo2 of 24 V is outputted, the DC voltage Vo2 is switched from 24 V to 5 V. However, the operation of the power source CPU 422 may be stopped without switching the DC voltage Vo2 from 24 V to 5 V. In this case, compared with the case where the DC voltage Vo2 is 24 V, in the case where the DC voltage Vo2 is 5 V, a threshold of the over current for stopping the operation of the power source CPU 422 can be set a low level. Thus, in the embodiment 2, a predetermined threshold in the operation in the second mode may be set at a value lower than a predetermined threshold in the operation in the first mode.

As described above, in the embodiment 2, the level state of the power source unit 420 is monitored, and in the case where a state in which the load abnormally increases, it is possible to prevent the breakage of the elements of the power source unit 420 and to cause the transition of the state of the voltage to a safe state. Further, when the DC voltage Vo2 of the power source unit 420 becomes 5 V for the operation in an electric power saving mode (low voltage mode), a point (threshold) for the over current detection is set at a low level. By this, in the case where the current value of the over current is not lowered even when the voltage is lowered, the operation is safely stopped, so that it is possible to prevent the breakage of the elements.

As described above, according to the embodiment 2, before the power source device breaks, the transition of the state of the power source device to the safe state is made, and the occurrence of the abnormality can be notified to the user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-102225 filed on Jun. 21, 2021, which is hereby incorporated by reference herein in its entirety.

What is claimed is:

1. An apparatus including a power source device which includes a converting unit configured to convert an AC voltage to a DC voltage and, the converting unit being operable in a first mode in which the converting unit outputs a first DC voltage and a second mode in which the converting unit outputs a second DC voltage lower than the first DC voltage, the apparatus comprising:
   a switching unit configured to switch the mode of an operation of the converting unit between the first mode and the second mode;
   a discriminating unit configured to discriminate whether or not an overcurrent state occurs in the converting unit;
   a display portion configured to display information; and
   a controller configured to carry out control so that in a case that the discriminating unit discriminates that the overcurrent state in the converting unit occurs during the operation of the converting unit in the first mode, the mode of the operation of the converting unit is switched to the second mode by the switching unit and then the controller causes the display portion to display information related to the overcurrent state in the converting unit.

2. The apparatus according to claim 1, wherein the converting unit includes a heat generating element configured to generate heat by a flow of a current, wherein, the power source device includes a temperature detecting unit configured to detect a temperature of the heat generating element, and wherein the discriminating unit discriminates that the overcurrent state occurs when the temperature detected by the temperature detecting unit is higher than a predetermined threshold.

3. The apparatus according to claim 2, wherein the converting unit includes:

a transformer including a primary winding and a secondary winding;

a switching element connected to the primary winding in series and configured to perform a switching operation by being turned on or off;

a power source controller configured to control the switching operation of the switching element;

a rectifying element configured to rectify a voltage induced in the secondary winding; and a smoothing unit configured to smooth, as the DC voltage, the voltage rectified by the rectifying element, wherein the heat generating element includes at least one of the primary winding, the secondary winding, the switching element, and rectifying element.

4. The apparatus according to claim 1, wherein the converting unit includes:

a transformer including a primary winding and a secondary winding;

a switching element connected to the primary winding in series and configured to perform a switching operation by being turned on or off;

a power source controller configured to control the switching operation of the switching element;

a rectifying element configured to rectify a voltage induced in the secondary winding;

a smoothing unit configured to smooth, as the DC voltage, the voltage rectified by the rectifying element; and a current detecting unit configured to detect a current caused to flow by the DC voltage, wherein the discriminating unit discriminates that the overcurrent state occurs when the current detected by the current detecting unit is higher than a predetermined threshold.

5. The apparatus according to claim 4, wherein the controller causes said power source controller to stop an operation of the power source controller when the discriminating unit discriminates that the overcurrent state occurs in the operation in the second mode.

6. The apparatus according to claim 5, wherein the predetermined threshold in the operation in the second mode is set at a value lower than the predetermined threshold in the operation in the first mode.

7. The apparatus according to claim 1, further comprising a generating unit configured to generate a third DC voltage, lower than the DC voltage, from the first DC voltage or the second DC voltage output by the converting unit, wherein the generating unit supplies the third DC voltage to the controller.

8. The apparatus according to claim 1, the apparatus being connected to an external device including a display portion configured to display information, wherein the controller notifies the external device that the overcurrent state occurs and then causes the display portion of the external device to display information related to the overcurrent state in the converting unit.

9. The apparatus according to claim 1, further comprising an image forming unit configured to form an image on a recording material, wherein the controller causes the image forming unit to print, on the recording material, information related to the overcurrent state in the converting unit.

10. The apparatus according to claim 1, wherein the apparatus is an image forming apparatus configured to form an image on a recording material.

* * * * *